MAGNETOSONIC THIN FILM MEMORY

Filed Oct. 14, 1965 2 Sheets-Sheet 1

INVENTORS
EDMUND U. COHLER
HARVEY RUBINSTEIN
BY
Stanley M. Schurgin
ATTORNEY

Sept. 2, 1969 E. U. COHLER ET AL 3,465,305

MAGNETOSONIC THIN FILM MEMORY

Filed Oct. 14, 1965 2 Sheets-Sheet 2

INVENTORS
EDMUND U. COHLER
HARVEY RUBINSTEIN
BY
Stanley M. Schurgin
ATTORNEY

United States Patent Office 3,465,305
Patented Sept. 2, 1969

3,465,305
MAGNETOSONIC THIN FILM MEMORY

Edmund U. Cohler, Brookline, and Harvey Rubinstein, Lynnfield, Mass., assignors to Sylvania Electric Products Inc., a corporation of Delaware Filed Oct. 14, 1965, Ser. No. 495,934
Int. Cl. G11b 5/62
U.S. Cl. 340—174 8 Claims

ABSTRACT OF THE DISCLOSURE

A memory employing a planar substrate of sonically conductive material having a transducer attached to one edge to impart a stress wave along the substrate. Formed on one surface of the substrate is a thin film of magnetostrictive material with its easy axis at an acuate angle to the direction of propagation of the stress wave. By applying a magnetic field to the film coincident with the stress wave, data is stored in the film.

This invention relates to magnetic data storage and more particularly to non-destructive thin film memories.

A magnetic thin film which is stressed exhibits different magnetic characteristics than an unstressed film; namely, reduced switching threshold and remanent flux. By suitably stressing the magnetic film, a properly oriented magnetic field, which is of insufficient strength to change the magnetic state of an unstressed film, can switch the magnetic state of the stressed film due to the reduced switching threshold. Data can thereby be written into the film by simultaneous application of a stress wave and a magnetic field. A stress wave alone will not switch the magnetization, but will cause a reversible flux change which can be detected to indicate the stored data, to thereby achieve non-destructive readout.

Attempts have been made in the past to construct thin film memories according to the above-mentioned principles, but thus far none have met with practical success. Previous investigators have generally employed a magnetic film of tubular configuration, the geometry of which is unsuitable for efficient utilization of the magnetic film. Due to the tubular geometry, the easy axis of the film is limited to the circumferential direction, and longitudinal stress waves have been employed since it is difficult to generate shear waves of sufficient magnitude in a cylinder.

Applicants have found that shear waves are more desirable than longitudinal waves in memories of the type under consideration, and that a planar geometry allows expeditious implementation of such a memory.

The planar geometry is easily fabricated by well known thin film techniques and multiple memory elements can easily be formed on a single substrate to provide a memory matrix. A shear wave can be generated relatively simply in this planar configuration and, in addition, is non-dispersive, allowing use of a sonic propagation medium of more practical dimension than permitted by longitudinal waves. Moreover, judicious choice of the direction of shear wave propagation relative to the easy axis of the thin film allows enhanced operation of the memory. Further, since shear waves travel at approximately half the velocity of longitudinal waves, the storage density of a magnetic film can be doubled for a given frequency of operation or, for a given storage density, the frequency halved.

In accordance with the present invention, a thin film of magnetizable material is formed on a planar surface of a sonically conductive substrate, and means are provided for establishing a magnetic field in the magnetizable film. An expedient way of providing the magnetic field is with a conductor disposed over this film. A second thin magnetizable film can be formed over the conductor to provide a closed magnetic path to thereby reduce undesirable magnetic interaction between adjacent magnetic areas. In operation, to write data into memory, a sonic wave is propagated through the substrate and a current pulse is transmited through the conductor. At the region of coincidence between the stress wave and the current pulse, the magnetic state of the film is switched due to the magnetic field of the current pulse and the reduced switching threshold produced by the stress wave. To read data from the memory, a stress wave alone is propagated through the substrate, causing a reversible flux change in the recorded areas, which induces a signal into the conductor which is indicative of the stored data.

The invention will be more fully understood from the following detailed description, taken in conjunction with the drawings, in which.

Figure 1:
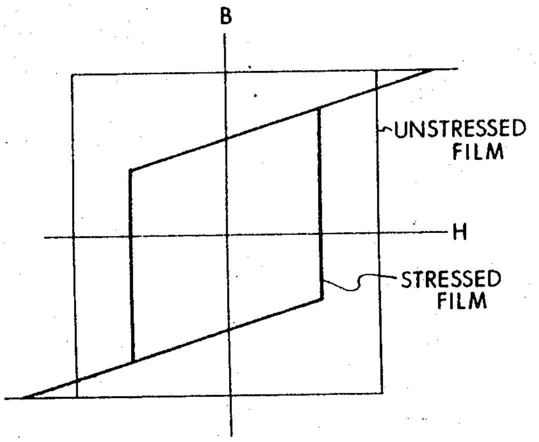
FIG. 1 depicts the hysteresis curves of a stressed and unstressed magnetic film.
Figure 2:
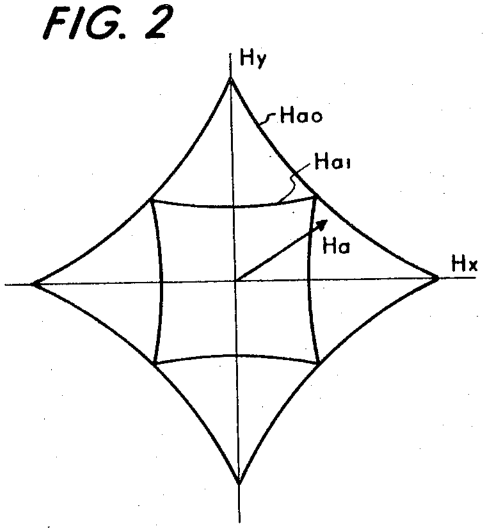
FIG. 2 is a plot of the locus of switching thresholds for magnetic fields in a magnetic film.

The hysteresis loops of a stressed and unstressed magnetic thin film are illustrated in FIG. 1. As is evident from these curves, the stressed film exhibits reduced coercive force and remanent flux. The physical mechanism by which these characteristics change is by reduction and rotation of the anisotropy in the presence of stress. This mechanism is illustrated graphically by the switching astroid curves of FIG. 2 which depicts the switching thresholds of a stressed and unstressed film; curves $H_{a1}$ and $H_{ao}$, respectively. A magnetic field vector outside the threshold curve will cause switching, whereas a field vector inside the threshold curve will not. Consider a magnetic field vector $H_a$ which is inside the unstressed threshold $H_{ao}$ and outside the stressed threshold $H_{a1}$. This magnetic field will not be capable of switching the magnetic film in the unstressed condition, but will be able to switch the stressed magnetic film because of the reduced switching threshold. Thus, information can be written into the thin film by applying coincidentally a stress wave and a magnetic field of suitable magnitude for the particular materials employed. Readout of information from the film is accomplished by applying a stress wave alone, which causes a change in magnetization, by rotation of the easy axis, which can be sensed by the voltage it induces in a nearby conductor. The change in magnetization is reversible, the magnetization returning to its original position when the stress is removed; thus, readout is accomplished in a non-destructive manner.

Figure 3:
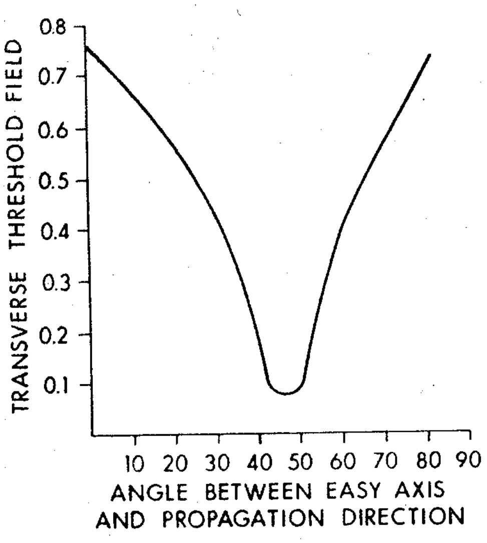
FIGS. 3 and 4 are curves depicting the dependence of switching threshold upon the direction of the easy axis and direction of stress wave propagation.
Figure 4:
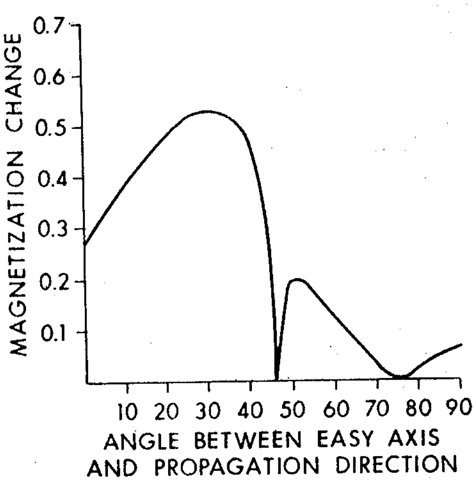

The interaction between the sonic wave and the magnetic field is dependent upon the relative orientation of the two fields, as illustrated by the curves of FIGS. 3 and 4. The magnitude of the magnetic field required to switch a stressed magnetizable film is depicted in FIG. 3 and varies from a maximum at small angles between the direction of stress propagation and the easy axis of the film to a minimum at an angle of 45°. The change in magnetization induced by a shear wave is depicted in FIG. 4 which shows the minimum induced change at an angle of 45° between the easy axis and the propagation direction. To provide an efficient memory, therefore, the angle between the easy axis and the propagation direction should be chosen to give the greatest change in magnetization with the smallest applied magnetic field. Applicants have found that an angle of about 30° produces the desired result.

Figure 5:
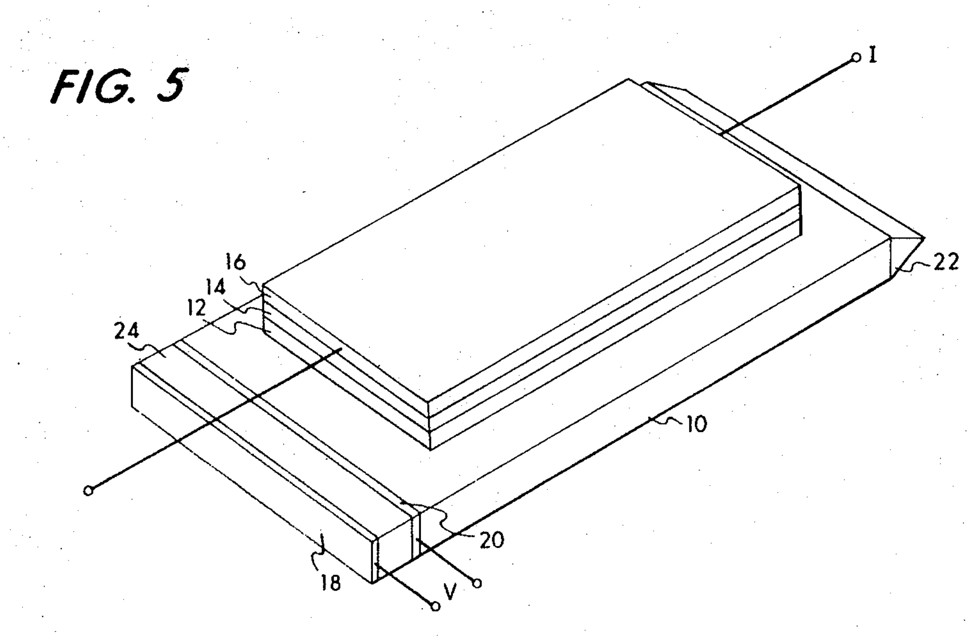
FIG. 5 is a greatly exaggerated pictorial view of one embodiment of the present invention.

A memory according to the above-discussed principles is embodied in the implementation illustrated in FIG. 5, wherein is shown, in greatly exaggerated form, a piezoelectric substrate 10 on which is deposited, in succession, a magnetizable thin film 12, an insulating layer 14 and a conductive layer 16. A pair of electrodes 18 and 20, separated by a dielectric 24, are affixed on one end of substrate 10 and are operative in response to an applied potential V, to generate a shear wave which propagates along the substrate away from the electrodes. An acoustic absorber 22 is attached to the end of substrate 10 opposite the electrodes to absorb the acoustic energy reaching the end of the substrate.

In operation, to write information into memory, a voltage waveform V is applied to electrodes 18 and 20 to excite piezoelectric substrate 10 to thereby propagate a stress pulse along its length. When the stress pulse reaches the position where data is to be recorded, a current pulse I from a suitable source is transmitted through conductor 16, producing a magnetic field which permeates thin film 12 and which switches its magnetic state in the region of coincidence between the stress wave and the magnetic field. The stress wave propagates relatively slowly with respect to the electromagnetic wave which propagates essentially at the speed of light. Thus, the point of coincidence where data is to be recorded is determined essentially by the stress wave, the electromagnetic wave propagating fast enough to intercept the stress wave as its selected position.

The substrate need not be piezoelectric, nor is a piezoelectric transducer necessary to generate a sonic wave, although it is at present an expedient way to do so; rather, any material capable of transmitting a sonic wave is usable as a substrate with suitable electrical, magnetic, mechanical or acoustic means employed to institute the sonic wave.

Figure 6:
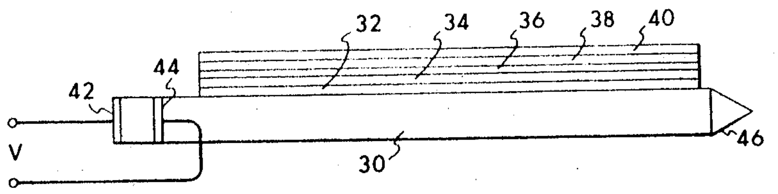
FIG. 6 is a greatly exaggerated elevation view of another embodiment of the invention.

To minimize magnetic interaction between adjacent bits of recorded data, to thereby increase the storage density of the thin film it is desirable to have a closed magnetic structure, such as illustrated in FIG. 6. Deposited on piezoelectric substrate 30 are a first magnetizable thin film 32, a first insulating layer 34, a conductive layer 36, a second insulating layer 38, and a second magnetizable thin film 40. As in the embodiment of FIG. 5, energizing electrodes 42 and 44 are provided on one end of substrate 30 to generate, in response to a pulse from source V, a shear wave which propagates down the substrate, and an acoustic absorber 46 is provided on the end of the substrate opposite the energizing electrodes to absorb the sonic pulses reaching the end of the line. The operation of this embodiment is identical to that of FIG. 5, except for the increased storage density provided by the closed magnetic path.

In a memory that has been successfully constructed and operated, an anisotropic film of magnetizable material composed of 60% nickel and 40% iron was vacuum deposited on a glass substrate in a rectangular pattern ½ inch by 20 mils to a thickness of 500 angstroms. A piezoelectric transducer was bonded on one edge of the glass substrate to generate the shear wave, and the easy axis of the film was oriented at an angle of 30° to the direction of shear wave propagation.

In a memory of practical size, a plurality of magnetizable films with their associated sense-drive conductors are formed in parallel spaced arrangement on a single substrate, and a plurality of these substrates containing the films are stacked one upon the other. Suitable addressing circuits select one of the substrates and certain of the sense-drive conductors. A stress wave is launched in the selected substrate and a current pulse is gated into the selected conductor to write data into memory. To read data out of memory, a stress wave is launched in the selected substrate, causing an output signal in the selected conductor which is indicative of the stored data. The density of this memory is several times greater than conventional techniques since the sonic pulses, because of the difference between the speed of electromagnetic and sonic waves, can be much shorter than electromagnetic pulses, and also because the use of stress pulses to read data eliminates read disturbing problems associated with all-electrical thin film memories. Moreover, the present memory is less expensive than conventional memories when fabricated in production quantities.

From the foregoing, it is evident that an effective magnetosonic thin film memory has been provided which is relatively simple to fabricate and which allows practical storage of data. The invention is not to be limited by what has been particularly shown and described except as indicated in the appended claims.

What is claimed is:

1. A magnetosonic thin film memory comprising:
a planar sonically conductive substrate;
a thin film of magnetostrictive material having an easy axis, said thin film being disposed on one surface of said planar substrate and having a pattern of magnetized areas therein;
means connected to said planar substrate and operative to cause a stress wave to propagate within said substrate at an acute angle with respect to the easy axis of said film of magnetostrictive material; and
means operative to sense a flux change in said film of magnetostrictive material caused by a stress wave.

2. A memory according to claim 1 in which said means operative to sense a flux change is a conductor disposed over said thin film.

3. A magnetosonic thin film memory according to claim 1 wherein said acute angle is within the range of 10 to 80 degrees.

4. A magnetosonic thin film memory comprising:
a planar sonically conductive substrate;
a thin film of magnetostrictive material having an easy axis and being formed on one surface of said substrate;
first means connected to an edge of said substrate and operative to cause a stress wave to propagate within said substrate at an acute angle with respect to the easy axis of said thin film of magnetostrictive material; and
second means for establishing a magnetic field in said thin film whereby the magnetic state of said thin film is changed in the region of coincidence of a stress wave and the magnetic field.

5. A memory according to claim 4 in which said first means is operative to cause a shear wave to be propagated within said substrate.

6. A memory according to claim 4 in which said first means is operative to cause a shear wave to be propagated within said substrate at an angle of about 30° with respect to the easy axis of said thin film.

7. A memory according to claim 4 in which said second means is a conductor disposed over said thin film.

8. A memory according to claim 4 and including a second thin film of magnetostrictive material disposed on said second means coextensive with the first mentioned thin film and electrically insulated therefrom.

(References on following page)

References Cited

UNITED STATES PATENTS

| | | | |
|---|---|---|---|
| 3,145,372 | 8/1964 | Suits et al. | 340—174 |
| 3,193,692 | 7/1965 | Davis et al. | 307—88 |
| 3,339,188 | 8/1967 | Weinstein | 340—174 |

OTHER REFERENCES

Convention on Digital-Computer Techniques, "Wire Type Acoustic Delay Lines for Digital Storage," by Scarrott et al.; Paper No. 2027M; March 1956, p. 497; 340–174.

Journal of the Acoustical Society of America, "Theory of Ultrasonic Delay Lines for Direct-Current Pulse Transmission," by Onoe, vol. 34; September 1962, p. 1247; 340–174.

STANLEY M. URYNOWICZ, Jr., Primary Examiner